(12) United States Patent
Dinh et al.

(10) Patent No.: US 6,582,170 B2
(45) Date of Patent: Jun. 24, 2003

(54) SLOTTED CONE FOR CHANNEL NUT

(75) Inventors: Cong Thanh Dinh, Memphis, TN (US); Mark R. Drane, Germantown, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/989,741

(22) Filed: Nov. 20, 2001

(65) Prior Publication Data

US 2002/0071735 A1 Jun. 13, 2002

Related U.S. Application Data

(60) Provisional application No. 60/253,782, filed on Nov. 29, 2000.

(51) Int. Cl.[7] ................................................. F16B 27/00
(52) U.S. Cl. ........................................................ 411/85
(58) Field of Search ............................... 411/84, 85, 104

(56) References Cited

U.S. PATENT DOCUMENTS

| | | | |
|---|---|---|---|
| 3,483,910 A | | 12/1969 | Londe et al. |
| 3,493,025 A | | 2/1970 | Londe et al. |
| 4,136,598 A | | 1/1979 | Hughes |
| 4,486,133 A | | 12/1984 | Pletcher |
| 4,645,393 A | | 2/1987 | Pletcher |
| 4,840,525 A | * | 6/1989 | Rebentisch ............... 411/85 |
| 5,209,619 A | * | 5/1993 | Rinderer .................. 411/85 |
| 5,628,598 A | | 5/1997 | Hofle |
| 5,655,865 A | * | 8/1997 | Plank ...................... 411/85 |

* cited by examiner

Primary Examiner—Flemming Saether
(74) Attorney, Agent, or Firm—Hoffmann & Baron, LLP

(57) ABSTRACT

A channel nut is attachable to a structural channel. The channel nut includes a nut portion having a planar surface and a resiliently flexible cone attachable to the nut portion. The cone includes an attachment portion for attachment to the planar surface of the nut portion, the conical portion extending conically from the attachment portion. The conical portion is defined by a conical wall having at least one slot therethrough to permit resilient deflection of the conical wall portion with respect to the attachment portion.

18 Claims, 3 Drawing Sheets

SLOTTED CONE FOR CHANNEL NUT

This application claims the benefit of U.S. Provisional Application No. 60/253,782, filed on Nov. 29, 2000.

FIELD OF THE INVENTION

The present invention relates generally to channel nuts for use with structural channels. More particularly, the present invention relates to an improved cone for fastening the channel nut to the channel.

BACKGROUND OF THE INVENTION

Elongate structural members have long been used for various purposes in the construction industry. These structural members, which are commonly referred to as struts, include an elongate channel having a generally U-shaped configuration. The upper edges of the U-shaped channel include inwardly turned flanges or shoulders extending along the length thereof. These inwardly turned shoulders support fastening hardwares which allow for the attachment of various loads which may be supported by the struts.

In order to permit attachment of loads to the strut, a threaded fastener or nut is positioned within the channel of the strut and secured thereto. Channel nuts of this type are shown, for example, in U.S. Pat. Nos. 3,483,025, 4,645,393 and 4,486,133. These channel nuts include a nut portion typically formed of metal having a generally rectangular configuration so that it may be inserted into the strut channel longitudinally beneath the inwardly turned flanges or shoulders. Thereafter, the nut portion is rotated approximately 90° to a transverse position so that it will engage the undersurface of the flanges.

In order to locate and retain the nut portion within the channel, conventional channel nuts include an attached flexible cone typically formed of resilient plastic extending upwardly therefrom. The cone is snap fitted onto the nut portion and due to the flexibility, resiliency and the particular shape forming the cone, the nut portion is continuously urged into engagement with the underside of the inwardly turned flanges of the channel.

In typical installation, as the nut is rotated to effect attachment, the cone slightly deforms or deflects to permit the nut portion to be captured by the inwardly turned flanges. The cone is returnable to its undeformed condition to provide a bias to hold the nut portion against the inwardly turned flanges. The deformability of the cone as well as its attachment to the nut portion is critical in providing the desired securement of the channel nut to the strut.

It may be appreciated that the material forming the cone should be suitably flexible so as to permit ease of installation and retention of the channel nut within the strut. However, it has been found that if the cone is formed of a material which is too flexible, it may be difficult to retain the cone in an attached condition to the nut portion. During installation and use, it is possible that the cone can become detached from the nut portion rendering the channel nut useless. Attempts to form the cone of a harder material results in superior attachment of the cone to the channel nut, but renders installation of the channel nut more difficult as more manual force is needed to deflect the cone portion to effect installation.

It is desirable to provide an improved channel nut having a cone which permits easy installation, yet remains captively attached to the channel nut portion.

SUMMARY OF THE INVENTION

The present invention provides a channel nut for attachment to a structural channel which may be more easily and securely manually attached thereto.

The channel nut of the present invention includes a nut portion having a planar surface. The resiliently flexible cone includes an attachment portion for attachment to the planar surface of the nut portion. The flexible cone further includes a conical portion extending conically outwardly from the attachment portion. The conical portion is defined by a conical wall having at least one slot therethrough to permit resilient deflectability of the conical wall with respect to the attachment portion.

In the preferred embodiment of the present invention, the slot extending through the conical wall is T-shaped having a vertical slot portion extending along the conical wall in a transverse slot portion extending in a section therewith. The attachment portion of the flexible cone is snap fitted onto the planar surface of the nut portion. The conical portion further includes finger grips extending inwardly from the conical wall so as to permit manual rotation of the channel nut onto the channel.

The channel nut is designed for use with a structural channel having a U-shaped cross section including upwardly extending sidewalls having inwardly turned upper flanges. The upper surface of the nut portion is engageable with the inwardly turned upper flanges of the channel sidewall.

DETAILED DESCRIPTION OF THE PREFERRED EMBODIMENT

Figure 1:
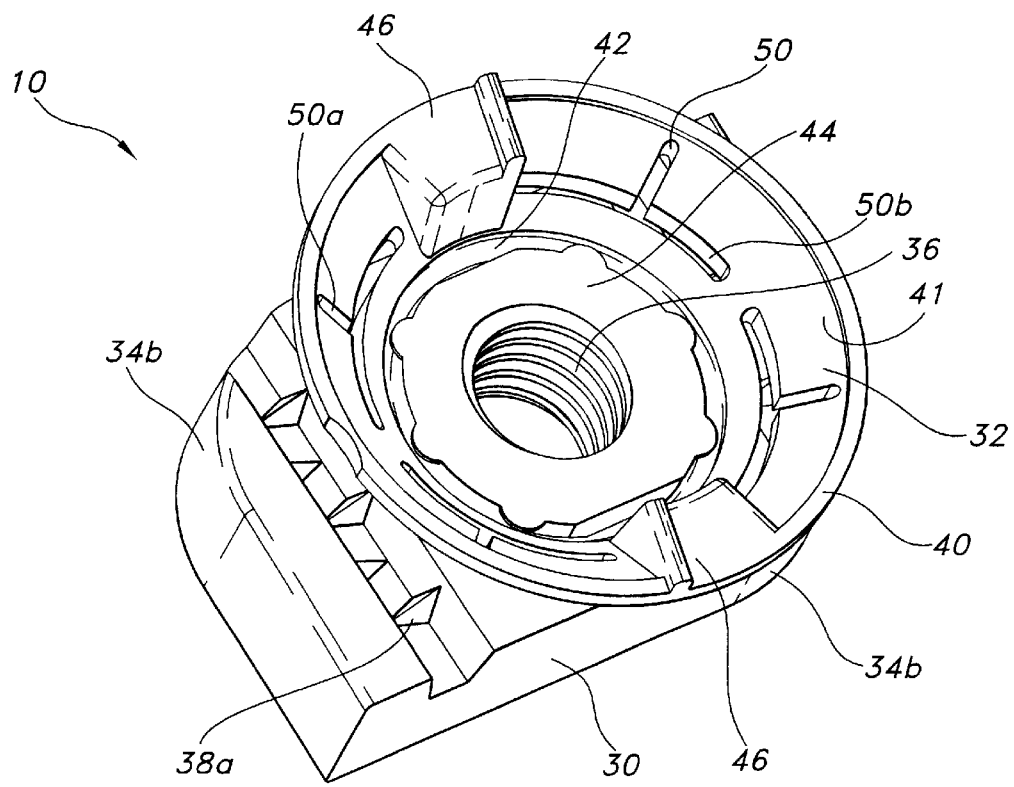
FIGS. 1 and 2 show a top and side perspective views respectively of the improved channel nut of the present invention.
Figure 2:
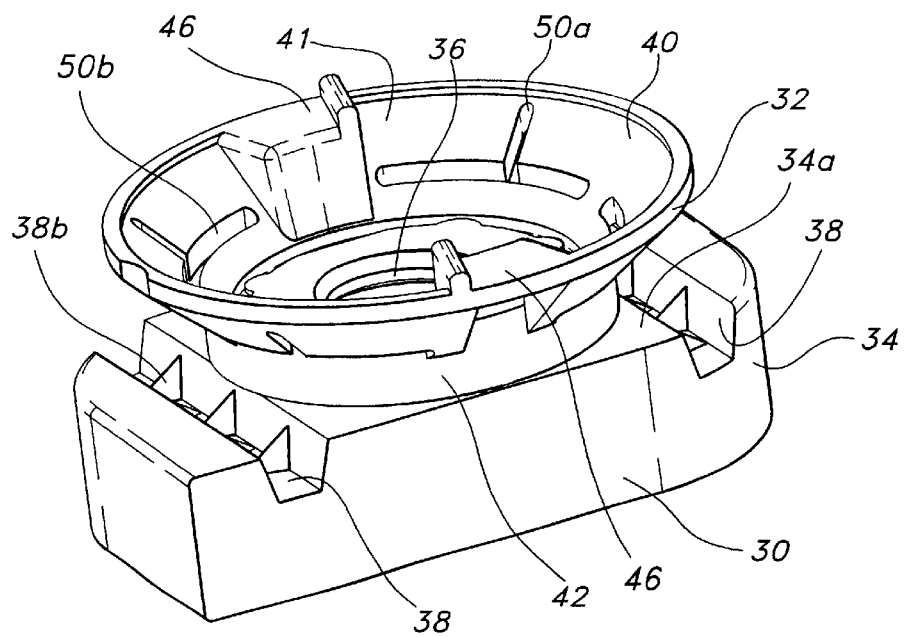
Figure 4:
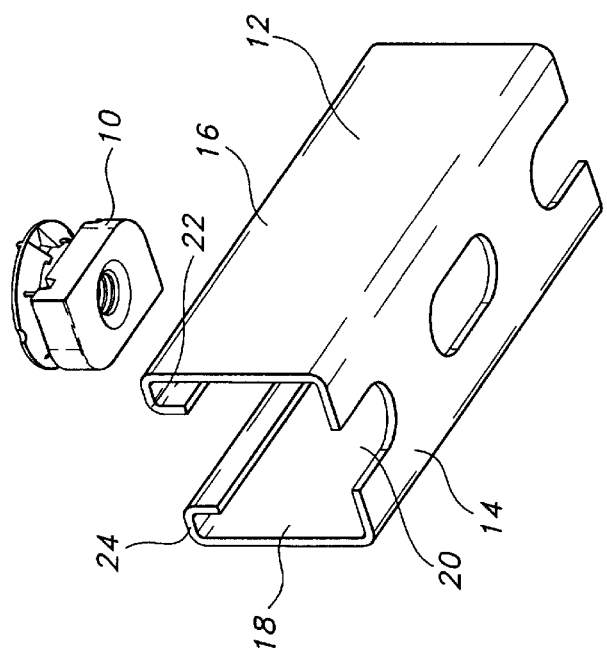
FIGS. 3, 4 and 5 show front, bottom and top perspective views respectively of the channel nut of the present invention positioned over a portion of a structural member.
Figure 5:
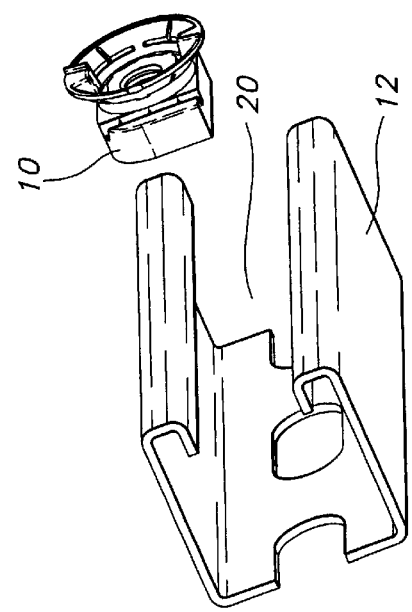
Figure 3:
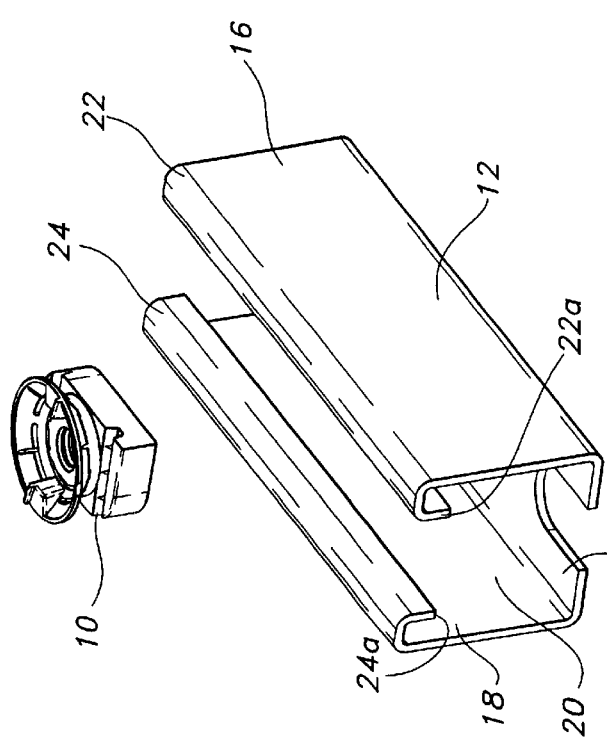
Figure 6:
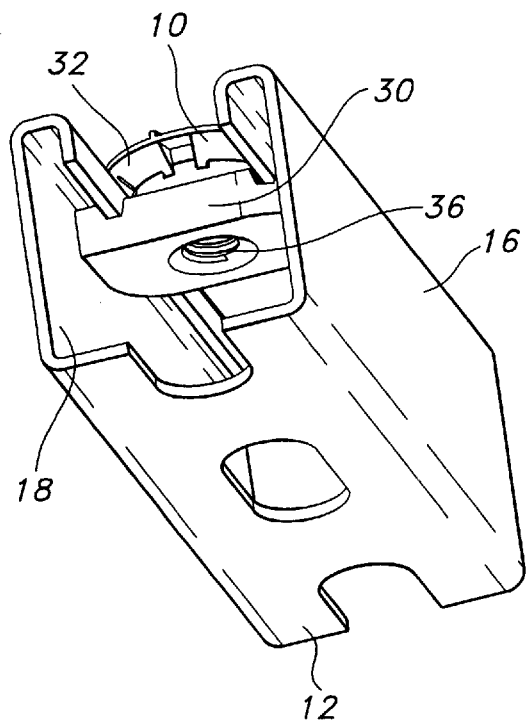
FIGS. 6, 7 and 8 show respectively bottom, front and top perspective views of the channel nut of the present invention attached to the structural member.
Figure 7:
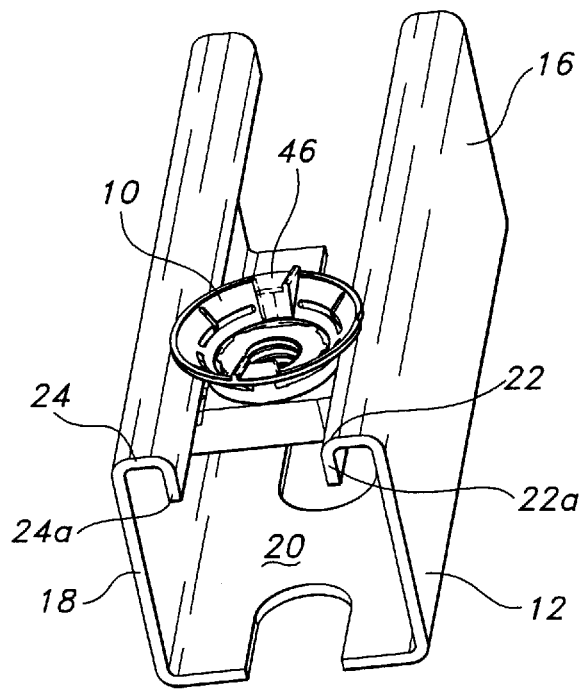
Figure 8:
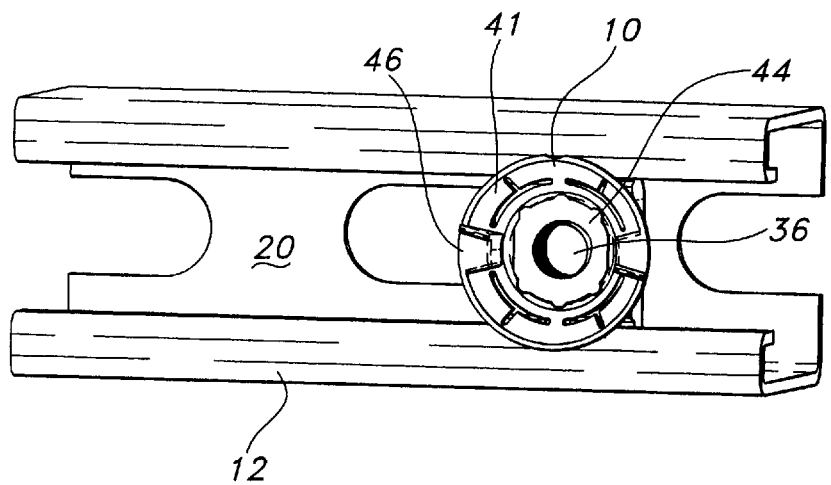

An improved channel nut 10 of the present invention is shown in FIGS. 1 and 2. Channel nut 10 is designed for attachment to a structural member 12, commonly referred to as a strut.

As particularly shown in FIGS. 3 through 8, strut 12 is an elongate member typically formed of metal, having a generally U-shaped cross-sectional configuration. The U-shaped configuration is defined by a bottom wall 14 and a pair of upwardly extending spaced apart sidewalls 16 and 18. Bottom wall 14 and the sidewalls 16 and 18 define an elongate channel 20. The upper extents of sidewalls 16 and 18 include inwardly turned flanges 22 and 24 having downwardly directed edges 22a and 24a which, as will be described in further detail hereinbelow, provide for the attachment of channel nut 10. Strut 12 is a conventional, structural member which is suspended within a building and is used to support mechanical and electrical devices.

Referring more specifically to FIGS. 1 and 2, channel nut 10 is a two-part component, including a nut portion 30 and a cone 32. Nut portion 30 is of conventional construction, having a generally rectangular body 34 typically formed of metal. Body 34 includes an internally screw-threaded central bore 36 for screw attachment of a bolt or similar fastening device (not shown). An upper surface 34a of body 34 includes a pair of spaced apart slots 38, which are spaced apart a distance corresponding to the inwardly turned flanges 22 and 34 of strut 12. Thus, when the nut portion 30 is inserted within the channel 20 of strut 12 and rotated, the edges 22a and 24a of inwardly turned flanges 22 and 34 will reside within slots 38. To facilitate insertion and rotation of nut portion 30, opposite diagonal corners 34b of body 34 may be rounded. As is known, slots 38 may include extending frictional gripping members 38a to facilitate securement of the nut portion to the edges of inwardly turned flanges.

In order to provide resilient securement of channel nut 10 to strut 12, cone 32 is secured thereto. Cone 32 is generally a plastic member which may be formed of resilient thermoplastic material. In the present invention, cone 32 may be particularly formed of nylon by injection molding or other suitable manufacturing technique. Cone 32 includes an upper conical portion 40 and a lower cylindrical portion 42. Lower cylindrical portion 42 may be snap-fitted around an upwardly extending generally annular protrusion 44 extending from surface 34a of nut 30 about threaded bore 36. The snap fit is sufficient to retain cone 32 on nut portion 30. Conical portion 40 includes a pair of diametrically opposed finger grips 46 on an inner conical surface 41 thereof. Finger grips 46 permit manual rotation of the channel nut upon attachment to strut 12.

The conical portion 40 of cone 32 further includes a plurality of T-shaped slots 50 formed therein. Each slot 50 includes a vertical slot portion 50a and a transverse slot portion 50b. The T-shaped slots 50 are arranged in equally rotationally spaced apart relationship about the cone. The T-shaped slots 50 provide enhanced flexibility to the cone so as to facilitate attachment of the channel nut 10 to the strut 12. This enhanced flexibility is provided as the slots can compress under manual pressure caused by attachment of the channel nut 10 to strut 12. The enhanced flexibility provided by slots 50 allows the channel nut 10 to more easily be attached to the strut 12, yet provides the desired degree of resilient compression to hold the channel nut 10 against inwardly turned flanges 22 and 24 of strut 12.

The enhanced flexibility of the cone 32 provided by the slots 50 also allows the conical portion 40 of the cone to resiliently deflect without transmitting such deflection forces to the cylindrical portion 42 attached to the nut portion 30. As the cone is deflected at the slots 50, no stress is transmitted to the cylindrical portion 42. This reduces the risk that upon installation of the channel nut 10, the cone 32 will become dislodged from the channel nut 30. As a result, the cone 32 may be formed of a more rigid material such as nylon without risk of detachment of the cone 32 from the nut portion 30. A rigid material such as nylon produces a better snap-fit engagement between the cone and the nut portion.

As shown particularly in FIGS. 1 and 2, the T-shaped configuration of slots 50 is preferred in that it provides enhanced flexibility of the cone when the cone is compressed in order to effect installation on strut 12. The vertical portion 50a of slot 50 provides for enhanced radial inward compression of the cone. The transverse slot 50b allows compression of the cone inward and downward without transmitting the force of such compression to the cylindrical portion 42.

While the particular T-shaped configuration shown herein is preferred, other slot-like configurations may be provided in accordance with the present invention. Further, depending on the particular size of the channel nut 10, 4 T-shaped slots have been found to be preferable. It, of course, may be appreciated that other numbers and locations of slots may also be employed in combination with the present invention.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the following claims.

What is claimed is:

1. A channel nut comprising:

a nut portion having a planar surface;

a resiliently flexible cone having an attachment portion for attachment to said planar surface of said nut portion and a conical portion extending conically outward from said attachment portion, said conical portion being defined by a conical wall having at least one slot therethrough to permit resilient deflectability of said conical wall with respect to said attachment portion;

wherein said slot is generally T-shaped having a vertical slot portion extending along said conical wall and a transverse slot portion in intersection therewith.

2. A channel nut of claim 1 wherein said conical wall includes a plurality of said slots rotationally spaced thereabout.

3. A channel nut of claim 1 wherein said attachment portion is snap fitted to said planar surface of said nut portion.

4. A channel nut of claim 1 wherein said conical portion includes finger grips extending inwardly from said conical wall so as to permit manual rotation of said channel nut.

5. A channel nut of claim 1 wherein said conical portion is formed of nylon.

6. A channel nut of claim 1 wherein said nut portion is formed of metal.

7. A channel nut for attachment to a structural channel, said channel having a U-shaped cross section including upwardly extending sidewalls with inwardly turned upper flanges, said channel nut comprising:

a nut portion insertable into said U-shaped channel, having an upper surface for engagement with said inwardly turned upper flanges;

a resiliently flexible cone having an attachment portion attached to said upper surface of said sidewall of said channel, said conical portion having a conical wall including at least one slot therethrough for providing said detachable resilient engagement with said sidewalls of said channel;

wherein said slot is generally T-shaped having a vertical slot portion extending along said conical wall and a transverse slot portion in intersection therewith.

8. A channel nut of claim 7 wherein said conical wall includes a plurality of said slots rotationally spaced thereabout.

9. A channel nut of claim 7 wherein said upper surface of said nut portion includes a pair of spaced apart slots for engagement with said inwardly turned flanges of said sidewalls of said channel.

10. A channel nut of claim 9 wherein said slots include frictional gripping members for secure engagement with said flanges.

11. A channel nut of claim 7 wherein said nut portion includes a central fastener-receiving aperture therethrough.

12. A channel nut of claim 7 wherein said nut portion is generally rectangular.

13. A channel nut of claim 12 wherein said nut portion includes a pair of diagonally opposite rounded corners.

14. A channel nut comprising:

a nut portion having a planar surface; and a flexible cone having a generally cylindrical attachment portion for attachment to said planar surface and a conical portion egressing from said attachment portion, said conical portion being defined by a conical wall;

said conical portion including at least one slot extending through said conical wall, said at least one slot being bounded by the conical portion on all sides such that the slot is completely contained within the conical portion.

15. A channel nut of claim 14 wherein said conical wall includes a plurality of said slots rotationally spaced thereabout.

16. A channel nut of claim 14 wherein said slot is generally T-shaped having a vertical slot portion extending along said conical wall and a transverse slot portion in intersection therewith.

17. A channel nut of claim 14 wherein said nut portion includes an annular protrusion extending from said planar surface.

18. A channel nut of claim 17 wherein said attachment member to snap fitted on said annular protrusion of said nut portion.

* * * * *